(12) United States Patent
Dalmazzo

(10) Patent No.: US 8,766,873 B2
(45) Date of Patent: Jul. 1, 2014

(54) AUTONOMOUS WIRELESS ANTENNA SENSOR SYSTEM

(71) Applicant: Enzo Dalmazzo, Miami, FL (US)

(72) Inventor: Enzo Dalmazzo, Miami, FL (US)

( * ) Notice: Subject to any disclaimer, the term of this patent is extended or adjusted under 35 U.S.C. 154(b) by 0 days.

(21) Appl. No.: 13/764,411

(22) Filed: Feb. 11, 2013

(65) Prior Publication Data

US 2013/0147683 A1   Jun. 13, 2013

Related U.S. Application Data

(63) Continuation of application No. 12/647,084, filed on Dec. 24, 2009, now Pat. No. 8,471,780.

(60) Provisional application No. 61/140,723, filed on Dec. 24, 2008.

(51) Int. Cl.
*G01R 29/08*  (2006.01)

(52) U.S. Cl.
USPC .......................... 343/894; 343/760; 343/890

(58) Field of Classification Search
USPC ................. 343/760, 878, 890, 894; 342/367; 455/561, 562.1
See application file for complete search history.

(56) References Cited

U.S. PATENT DOCUMENTS

| 8,193,983 | B1 | 6/2012 | Farmer |
| 8,471,780 | B2* | 6/2013 | Dalmazzo ..................... 343/894 |
| 2008/0169413 | A1 | 7/2008 | Austin et al. |
| 2009/0021438 | A1 | 1/2009 | Webb et al. |
| 2009/0061941 | A1 | 3/2009 | Clark |
| 2010/0164833 | A1 | 7/2010 | Dalmazzo |
| 2012/0062356 | A1 | 3/2012 | Mann et al. |

FOREIGN PATENT DOCUMENTS

| DE | 20311407 | 9/2003 |
| WO | WO 2009/097282 | 8/2009 |

* cited by examiner

*Primary Examiner* — Tan Ho
(74) *Attorney, Agent, or Firm* — Feldman Gale, P.A.; Michael C. Cesarano

(57) ABSTRACT

Systems and methods are enclosed for processing antenna position information. The systems and methods involve positioning at least one sensor in proximity to an antenna for measuring alignment of the antenna; at a ground station in proximity to a tower holding the antenna, periodically receiving antenna alignment information from the at least one sensor; and transmitting the alignment information to a control station for determination whether the alignment of the antenna complies with antenna specifications.

15 Claims, 4 Drawing Sheets

AUTONOMOUS WIRELESS ANTENNA SENSOR SYSTEM

CROSS REFERENCE TO RELATED APPLICATIONS

The present application is a continuation of and claims the benefit of previously filed, co-pending U.S. patent application Ser. No. 12/647,084, filed Dec. 24, 2009, by Enzo Dalmazzo, which claims benefit of provisional Application, Ser. No. 61/140,723, filed Dec. 24, 2008 by Enzo Dalmazzo, entitled Autonomous Wireless Antenna Sensor System, the disclosure of this application being incorporated herein.

FIELD OF THE INVENTION

The present invention relates to the field of wireless communications, and more particularly, to the application of telemetry to improve the robustness of wireless communications infrastructures.

BACKGROUND OF THE INVENTION

An essential part of a wireless service provider's business is its ability to provide adequate communication capabilities to its customers. In order to provide such capabilities, wireless service providers deploy communication antennas on towers, rooftops, buildings, and other tall structures. The height of such structures allows the radio signal from each communication antenna to travel several miles, establishing a geographic area within which service may be provided to customers. Wireless service providers typically install several directional communication antennas per site as multiple directional communication antennas are needed for increased capacity and reception.

In order to provide the required radio signal throughout a defined area, each directional antenna is intended to face a specific direction (referred to as "azimuth") relative to true north, to be inclined at a specific downward angle with respect to the horizontal in the plane of the azimuth (referred to as "downtilt") and to be vertically aligned with respect to the horizontal (referred to as "skew"). Undesired changes in azimuth, downtilt, and skew will detrimentally affect the coverage of a directional antenna. These alignments may be likened to the axes commonly used to describe the attitude of an aircraft: Azimuth corresponds to the yaw of an aircraft about a vertical axis; skew corresponds to the roll of an aircraft about its longitudinal axis; and downtilt corresponds to the pitch of the nose of an aircraft above or below a horizontal plane (or about a lateral axis extending horizontally through the aircraft at right angles to the longitudinal axis). In general, the more accurate the installation, the better the network performance that may be achieved within the area served by the antenna. Directional antenna installations are performed by tower companies who use certified tower climbers to carryout such installations.

An antenna's azimuth, downtilt and/or skew can change over time, due to the presence of high winds, corrosion, poor initial installation, vibration, hurricanes, tornadoes, earthquakes, or other factors. It is common for wireless service providers to conduct periodic audits of their communication antennas to ensure that each antenna has not deviated significantly from its desired azimuth, downtilt and/or skew. Wireless service providers frequently hire third party tower companies to perform audits and to make any necessary adjustments to maintain the desired azimuth, downtilt and skew. Such audits, however, may be labor intensive and dangerous, frequently requiring certified tower climbers to physically inspect each antenna, and to take appropriate measurements to determine any deviance from the desired positioning. This task can become even more time consuming if many towers are affected as a result of a hurricane or storm, in which case it could take between two to four months to figure out which towers have been affected, as the antennas have to be checked one by one.

Given the present state of the art, there is a need in the art for means for remote and continuous monitoring to determine whether and to what extent the desired physical positioning of an antenna has been altered.

SUMMARY OF THE INVENTION

The present invention includes an autonomous wireless antenna sensor system that provides wireless service providers with an alternative to periodic audits or spot checks following events that may have changed an antenna's positioning. The autonomous wireless antenna sensor system of this invention measures physical changes in the azimuth, downtilt, or skew of a communication antenna. The system of the present invention may initiate an alert to a wireless service provider, for example, when it detects is a change in the azimuth, downtilt or skew of a communication antenna sufficient to require realignment of the antenna, or when it detects a tilt that is unacceptable.

The autonomous wireless antenna system of the present invention may include three subsystems: a wireless antenna sensor, a remote sensor control station, and a remote graphical user interface ("GUI"). The system may also include a repeater or relay device, used to retransmit sensor signals to the remote sensor control station. In one embodiment of the present invention, a wireless antenna sensor measures changes in antenna azimuth downtilt and skew by using a gyroscope microchip and an accelerometer microchip, or a combination of both. Information regarding changes in antenna alignment can be relayed from the wireless antenna sensor attached to the communication antenna to the remote sensor control station located near the wireless service provider's base station at the foot of an antenna tower, using any low power wireless communication medium, such as Zigbee IEEE 802.15.4, Bluetooth, or WiFi. If desired, a wired connection, such as one following AISG Standards, may also be used for this purpose.

It is an object of this invention to provide a method for remotely monitoring changes in the positioning of antennas mounted on towers or other difficult-to-access locations so that appropriate and timely corrections may be applied.

It is another object of the invention to provide a user interface that is remote from a number of antenna sites, whereby changes in the positions of one or more antennas may be detected, and appropriate remedial treatment may be applied.

It is a further object of the invention to provide electrical power to microchips on antennas without a requirement for running an electrical wire from a ground-based power grid to the antennas.

It is yet another object of the invention to provide a method for remotely measuring the degree of misalignment of an antenna so that appropriate corrective measures may be taken without the need to conduct full re-alignment procedures.

These and other objects of the invention will become apparent in the following descriptions of the drawings and of the invention.

DETAILED DESCRIPTION OF PREFERRED EMBODIMENTS

Figure 1:
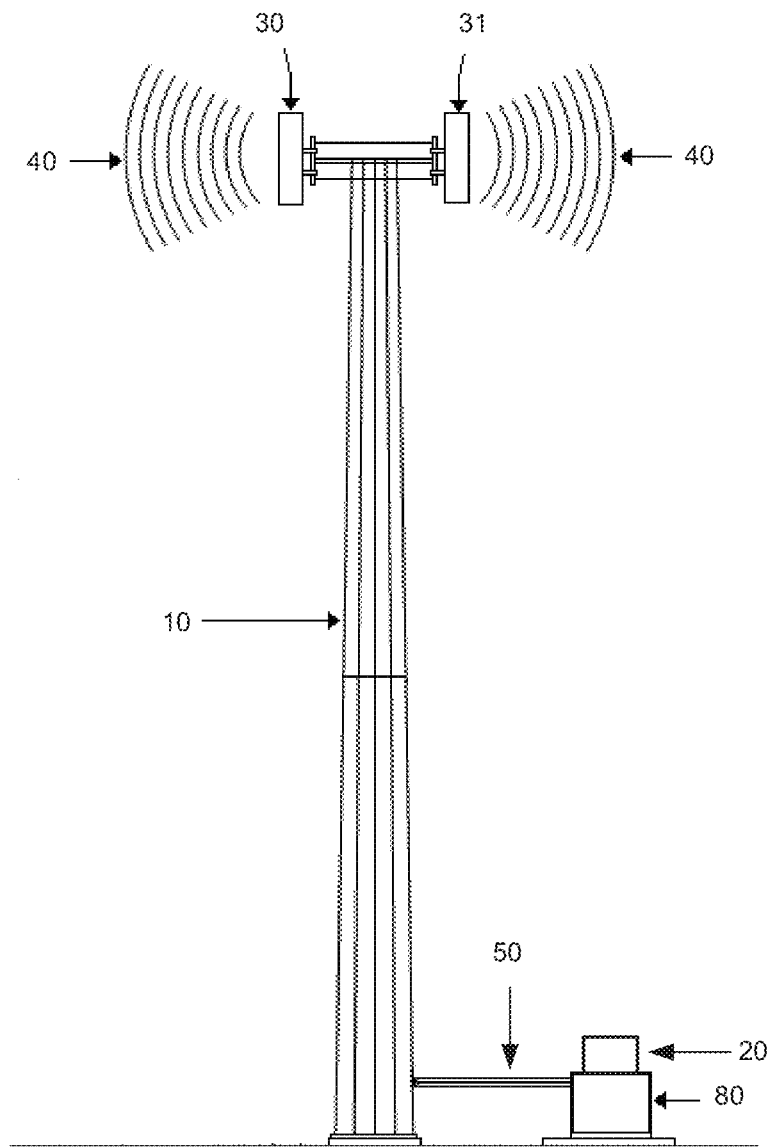
FIG. 1 is a schematic drawing illustrating an antenna tower and antennas used in an autonomous wireless antenna sensor system in accordance with at least one embodiment of the present invention.

The present invention together with the aforesaid objects and advantages is best understood from the following detailed description of the preferred embodiments of the invention. The autonomous wireless antenna system of the present invention may include three subsystems: a wireless antenna sensor, a remote sensor control station, and a remote graphical user interface ("GUI"). The system may also include a repeater or relay device, used to retransmit sensor signals to the remote sensor control station. In one embodiment of the present invention, a wireless antenna sensor measures changes in antenna azimuth downtilt and skew by using a gyroscope microchip and an accelerometer microchip, or a combination of both. In one embodiment of the present invention, a gyroscope microchip may be used to measure variations in azimuth, and an accelerometer microchip may be used to measure changes in downtilt and skew. In embodiments where such microchips feature high precision and sensitivity, signals from both sensors may be used as inputs to a processor whose output combines and processes the sensor information to provide a more accurate means for determining and measuring changes of an antenna's azimuth, downtilt, and skew. Variations in antenna alignment that can be false alarms may be reduced or eliminated though signal processing, for example, by cross referencing instantaneous accelerometer information against longer term gyroscopic information.

The remote sensor control station of the present station may relay antenna alignment data via a wired or wireless communications link. In this manner, the remote sensor control station can provide antenna alignment information to a remotely-located user viewing a graphical user interface. In one embodiment, software for monitoring and recording alignment information and changes provide a baseline for determining when sufficient misalignment has occurred to require a wireless service provider to take corrective action (e.g., by contracting an antenna maintenance company to properly align antenna).

In one embodiment of the present invention, the wireless antenna sensor and its wireless communications system may function with low power requirements which can be satisfied in any of a number of ways. For example, Radio Frequency ("RF") energy may be harvested from the RF signal emitted by the antenna site itself to provide power to run the wireless antenna sensor and its wireless communication system. Alternatively, solar power, wind power, or piezo electric power (e.g., generated from mechanical stress as the tower is moved by the wind), coupled with a battery or storage capacitor, may produce power sufficient to run the system. If desired, electrical power from a base station may be provided through a new or existing electrical wire on the tower. The wired option, which may follow AISG Standards, may require additional electrical wire to be run up the tower.

As wireless antenna sensors used on the antennas may have unique electronic serial numbers, the system of this invention is not limited to only indicating when an antenna becomes misaligned, but may also specifically identify the antenna from which the measurements are taken. Wireless service providers can use the antenna identification information to accurately manage antenna assets. Thus, one of the advantages of the present invention is that maintenance or replacement can more easily and accurately be achieved than is currently possible through the haphazard antenna maintenance procedures currently used by most third party tower maintenance companies.

Once the components of the system of the present invention are installed, a wireless service provider would no longer need to hire third party tower companies to verify antenna azimuth, downtilt or skew through visual observation or manual field measurements. Use of the present invention allows sensing of antenna positioning as changes in the positioning occur, such as for example, a change in the attitude of the sensors attached to the antenna. The antenna position changes may be relayed to a remote sensor control station, and also the wireless service provider may be notified of any undesired changes via a Remote GUI, for example.

FIG. 1 illustrates two embodiments of the wireless antenna system of the invention. The wireless antenna system may be retrofitted on a tower 10 supporting multiple antennas 30, 31 receiving and radiating electromagnetic energy in the RF range 40. The antennas 30, 31 may also radiate in other frequency bands.

FIG. 1 shows at the base of the tower 10 a base transceiver station 80 which may also house and electrically support a remote receiver control unit 20. Cables 50 may conduct communication signals to and from antennas 30, 31, and may be part of the original antenna installation.

Figure 2:
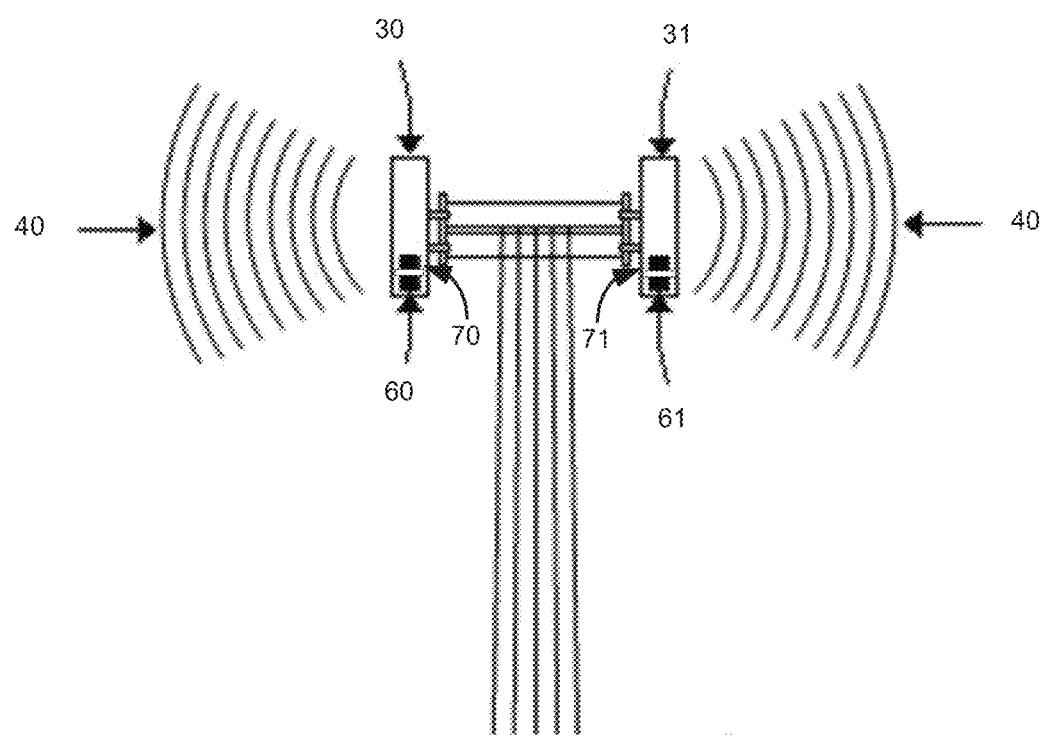
FIG. 2 is a schematic drawing illustrating the mounting of wireless antenna sensors to antennas in accordance with one embodiment of the present invention.

FIG. 2 illustrates another aspect of the invention where antennas 30, 31 are attached to the antenna tower 10, and include microchip sensors 60, 61, and 70, 71 secured directly to the antennas. For each antenna, one microchip (70, 71) may serve as an accelerometer to measure antenna movement in two directions, as along X and Y axes, such as tilt and skew, and a second microchip (60, 61) may serve as a gyroscope to measure angular movement, such as variations in azimuth. In an alternative embodiment, a combination of signals from microchips attached to the antennas, when processed by a CPU, may also provide precise information regarding changes in antenna positioning without triggering false alarms.

Figure 3:
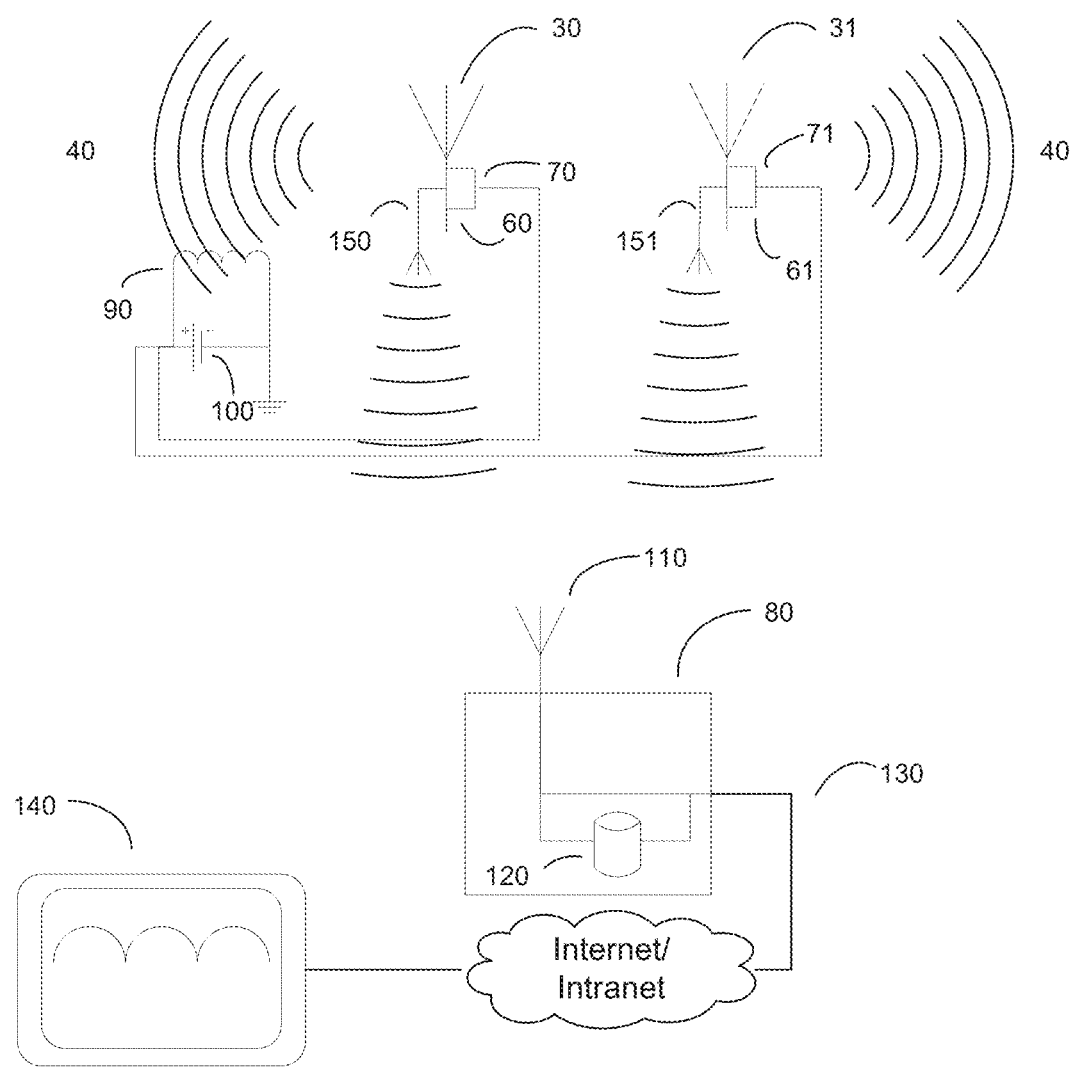
FIG. 3 is a schematic drawing illustrating the components and communications media for an autonomous wireless antenna sensor system in accordance with one embodiment of the present invention.

FIG. 3 is a schematic depiction of the operation of the system in accordance with one embodiment of the present invention in which two antennas 30, 31 are being monitored for movement away from a desired orientation. As is shown in FIG. 3, movement sensors 60, 61, 70, 71 generate signals that are fed to and transmitted by smaller antennas 150, 151 to receiving antenna 110 at ground station 20. In an alternative embodiment, the signals transmitted by antennas 150 and 151 are received by a repeater 21 (FIG. 1) which in turn may retransmit these signals at the same or a different frequency to the antenna 110. The repeater may be positioned anywhere within the coverage of the antennas 150 and 151.

A sensor (e.g., 60, 61, 70, or 71) may be powered by one or more RF energy harvesting 90 and storage devices 100 located on the tower 10 in the vicinity of the antennas. In one embodiment, the wireless antenna sensors may be located within a housing to prevent moisture buildup. The sensors may be attached to the antenna using any conventional attachment method. Alternatively, industrial strength adhesive tape may be used for attaching the wireless antenna sensors to their respective communication antennas 30, 31.

The sensors and/or the wireless antennas may have a unique electronic serial numbers which may serve to identify a specific antenna or sensor. The wireless antenna sensors may transmit the measured antenna alignment information (e.g., change in azimuth, tilt or skew) to remote sensor control station 20 or the relay station 21 together with antenna or sensor identification information. In one embodiment, the wireless antenna sensor, through its corresponding antenna (e.g., 150 or 151), communicates over the air with remote sensor control station 20 via Zigbee IEEE 802.15.4 Wireless Standard or its equivalent.

The remote sensor control station 20 may be installed in or around the wireless service provider's base transceiver station 80 that is conventionally located on or near the ground level. In one embodiment of the present invention, at least one remote sensor control station 20 may be present at each site. A remote sensor control station may have a unique address, such as a MAC or IP address.

The remote sensor control station 20 may periodically request or receive measurement results from the wireless antenna sensors 60, 61, 70, 71. The intervals for which the measurements are taken may be user defined. Measurement records may be date and time stamped. The remote sensor control station may assign a user defined name to each wireless antenna sensor and data from the sensors may be processed and placed on a lookup table. An antenna name may reference a particular antenna being measured by each wireless antenna sensor. The remote sensor control station may be programmed to report only defined wireless antenna sensors in order to ensure that only the desired antenna(s) are being monitored. Measurement reports may be stored in the remote sensor control station's memory or on a hard storage device 120. Once measurements are stored, they may be retrieved from the remote sensor control station either locally using a PC and a data cable (USB or other suitable connector) or remotely, such as via a Telco (i.e., T1) or mobile communication device/data card (such as, for example, GSM/CDMA/IDEN/SATELITE).

Information stored, and management functions of the autonomous wireless antenna sensor system, may be remotely controlled via a local area network ("LAN") or Internet connection 130 by a remote user GUI 140. The remote user GUI may be web based and may require a user name and password in order to access it. The remote user GUI can be hosted on either the Internet or the user's intranet. The remote user GUI's functions include retrieving the data from online remote sensor control stations and storing the data on a database which may be an online database. Once the data is imported, the user can upload the desired/target measurements for azimuth, tilt and skew which determine the specifications to which the antennas should adhere. The most recent measurement results may be displayed by date, time, site name, and antenna name. The user may request that the difference in measurement from a desired/target position for each antenna be provided in a report generated by the system. The user may also define the maximum difference measurement that will be allowed and request that the remote user GUI produce an alarm log that will display all out-of-specification antennas. The user may also require that the remote user GUI notify him or her, via e-mail or other communication means, of any out-of-specification antennas, at which time the user may reposition the specific antenna. By correcting the orientation of out-of-specification antennas as adverse conditions develop, needless testing and periodic third party audits may be avoided.

Figure 4:
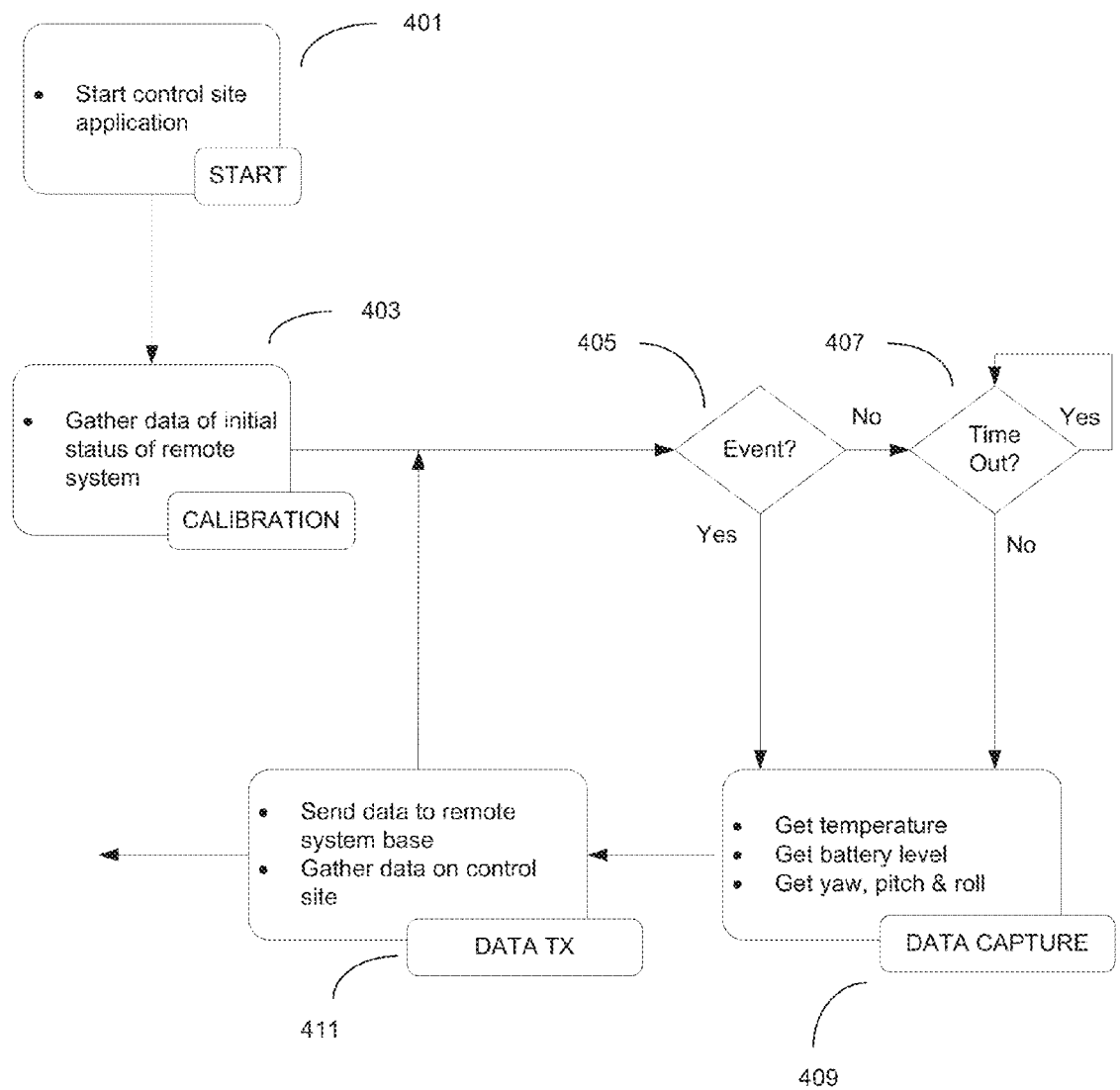
FIG. 4 is a schematic drawing illustrating a first method for obtaining antenna alignment information in accordance with one embodiment of the present invention.

FIG. 4 illustrates a first method for obtaining antenna alignment information in accordance with one embodiment of the present invention. In this embodiment, the remote system 80 is active and remains in low power mode when no event occurs. An event may be defined as a change in antenna positioning that deviates from acceptable antenna specification. In step 401 the remote system 80 is powered and an application running in an end-user's computer, for example, is started. This application may be used in conjunction with the GUI 140 to interface with and control certain functions of the remote site 80. In step 403 the end-user computer, which may also be referred herein as the remote system base, gathers data indicative of the status of the remote system 80 and optionally sends calibration commands to the remote station 80.

In step 405 the remote station 80 determines whether an event has occurred. If no event is detected, the remote system 80 enters in a wait mode. After a time out period (which may be changed by the system operator) elapses, the remote system 80 captures data (409) provided by antenna sensors, which may include temperature, sensor battery level, and the antenna alignment information (e.g., yaw, pitch, or roll). In step 411 the captured data may be sent to the remote base system together with control data from the remote site 80.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing antenna position information comprising the steps of:
deploying at least one sensor in proximity to an antenna for measuring alignment of the antenna;
at a ground station in proximity to a tower holding the antenna, periodically receiving antenna alignment information from the at least one sensor; and
transmitting said alignment information to a control station for determining whether the alignment of the antenna complies with antenna specifications;
said at least one sensor comprising a gyroscope microchip or an accelerometer microchip or combination of both, said gyroscope microchip or accelerometer microchip sensing changes in antenna azimuth, downtilt, or skew.

2. A method for maintaining the robustness of wireless communications infrastructures comprising the steps of:
deploying in proximity to an antenna at least one sensor for measuring alignment of said antenna;
periodically transmitting alignment information measured by said at least one sensor to a sensor control station in proximity to a structure holding the antenna; and
transmitting said antenna alignment information from said sensor control station to a graphical user interface station; and
comparing said alignment information with predetermined antenna alignment settings;
said at least one sensor comprising a gyroscope microchip or an accelerometer microchip or combination of both, said gyroscope microchip or accelerometer microchip sensing changes in antenna azimuth, downtilt, or skew.

3. The method according to claim 2, further comprising:
determining whether said measured antenna alignment information falls within an acceptable range of variance of said predetermined antenna alignment settings; and
calculating offset antenna alignment information for realigning said antenna when said antenna alignment information falls outside the acceptable range of variance.

4. The method according to claim 3, further comprising realigning said antenna in accordance with said offset antenna alignment information.

5. The method according to claim 2, wherein said measured antenna alignment information is transmitted wirelessly from said at least one sensor to said sensor control station.

6. The method according to claim 2, wherein said measured antenna alignment information is transmitted wirelessly from said sensor control station to said graphical user interface station.

7. The method according to claim 2, wherein said measured antenna alignment information is transmitted over a computer network from said sensor control station to said graphical user interface station.

8. The method according to claim 2, wherein said measured antenna alignment information comprises azimuth, skew, or downtilt information.

9. The method according to claim 2, wherein said predetermined antenna alignment settings comprise optimal azimuth, skew, or downtilt alignment settings.

10. A system for maintaining the robustness of wireless communications infrastructures, comprising:
at least one sensor suitable for measuring alignment of an antenna and for transmitting said measured antenna alignment data wherein said measured alignment information comprises azimuth, skew, or downtilt information;
a sensor control station suitable for receiving said measured antenna alignment data from said at least one sensor and retransmitting said measured antenna alignment data;
a graphical user interface station suitable for receiving said retransmitted measured antenna alignment data from said sensor control station, comparing said received measured antenna alignment data with predetermined antenna alignment settings, and determining whether measured alignment antenna settings fall within an acceptable range of variance of predetermined antenna alignment settings;
said at least one sensor comprising a gyroscope microchip or an accelerometer microchip or combination of both, said gyroscope microchip or accelerometer microchip sensing changes in antenna azimuth, downtilt, or skew.

11. A system according to claim 10,
wherein at least one sensor is capable of wirelessly transmitting measured alignment setting information to said sensor control station; and
wherein the communication between said at least one sensor and said sensor control station is powered by a device with a low power consumption.

12. A system according to claim 10,
wherein power requirements for transmissions in the system are provided by solar power, wind power, or piezoelectric power.

13. A system according to claim 10,
wherein at least one sensor is capable of wirelessly transmitting measured alignment setting data to said sensor control station; and
wherein power requirements for transmissions in the system are provided by energy harvested from a radio frequency signal.

14. A system according to claim 10,
wherein at least one sensor is capable of wirelessly transmitting measured alignment setting data to said sensor control station; and
wherein said graphical user interface station provides a user with a notification that an antenna's alignment falls outside the acceptable range of variance as compared with said predetermined antenna alignment settings.

15. A method for processing antenna position information comprising the steps of:
deploying at least one sensor in proximity to an antenna for measuring alignment of said antenna;
at a sensor control station in proximity to a tower holding said antenna, periodically receiving antenna alignment information from said at least one sensor; and
transmitting said alignment information to a graphic user interface station for determining whether the alignment of said antenna complies with antenna specifications;
said at least one sensor comprising a gyroscope microchip or an accelerometer microchip or combination of both, said gyroscope microchip or accelerometer microchip sensing changes in antenna azimuth, downtilt, or skew.

* * * * *